May 21, 1957  H. C. OBER  2,792,770
POWER DRIVEN ROTARY TILLER
Filed Nov. 19, 1954  2 Sheets-Sheet 1

INVENTOR.
Howard C. Ober,
BY Geber & Leonard,
his ATTORNEYS.

May 21, 1957
H. C. OBER
2,792,770
POWER DRIVEN ROTARY TILLER
Filed Nov. 19, 1954
2 Sheets-Sheet 2
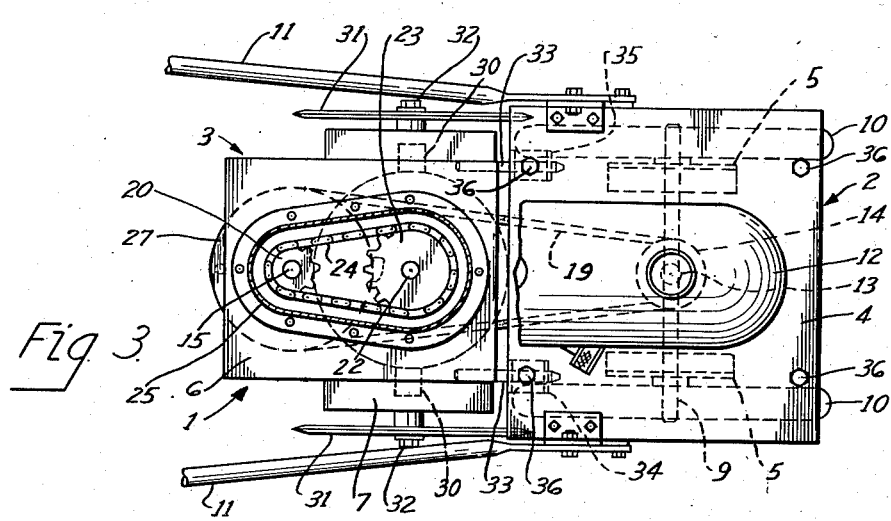
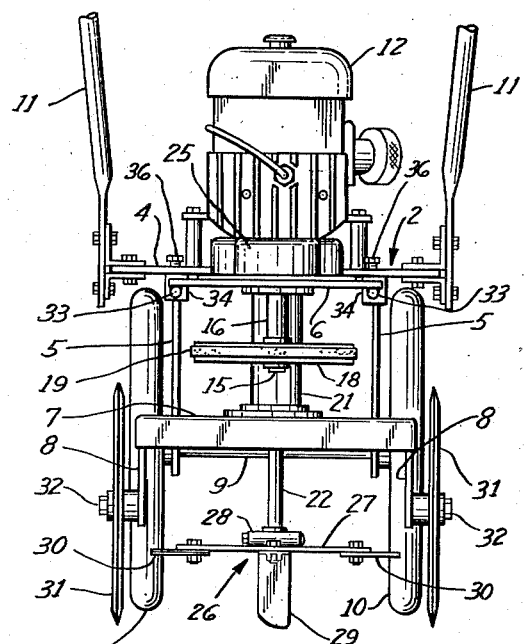
INVENTOR.
Howard C. Ober,
BY
Geho & Leonard,
his ATTORNEYS.

United States Patent Office 2,792,770
Patented May 21, 1957

2,792,770

POWER DRIVEN ROTARY TILLER

Howard C. Ober, Lyndhurst, Ohio

Application November 19, 1954, Serial No. 469,977

2 Claims. (Cl. 97—43)

This invention relates to a device for tilling soil, for pulling weeds therefrom concurrently with the tilling thereof, and for concurrently loosening and cutting up the weeds and mixing the cut-up portions with the tilled soil concurrently with the tilling thereof.

The device generally comprises a two-wheeled carriage supporting a rotary tool and having manipulating handles thereon by which the carriage can be guided and propelled, and tilted about the axle of the wheels so as to raise and lower the tool and cause it to penetrate the soil to the depth desired. An engine on the carriage is drivingly connected to the tool for driving it independently of the travel of the carriage. The carriage has two portions of which one supports the engine and of which the other supports the tool, the two portions being arranged so that they can be detachably connected in two positions in one of which the tool is in advance of the wheels of the carriage and in the other of which it is at the rear of the wheels of the carriage. The tool is rotatable by the engine about a generally upright axis and has sub-surface tillers and supra-surface cutters or prongs distributed alternately relatively to each other about the upright axis. The sub-surface tillers are arranged to penetrate and loosen the soil as the supra-surface prongs pull out or cut up weeds. Lateral cutting and retaining discs are provided at opposite sides of the carriage and are arranged to penetrate the soil at opposite sides of the path of the tools so as to assist in loosening the soil, in keeping the cultivated path accurately defined, and in confining the loosened soil and chopped weeds so as to reduce their lateral scatter and prevent damage to plants adjacent the path of the tools by flying clods and pieces of weeds.

Various objects and advantages will become apparent from the following description wherein reference is made to the drawings in which:

Figures 3 and 4 are a top plan view and a rear elevation, respectively, of the device illustrated in Figure 1, part of the handles being removed.

Figure 1:
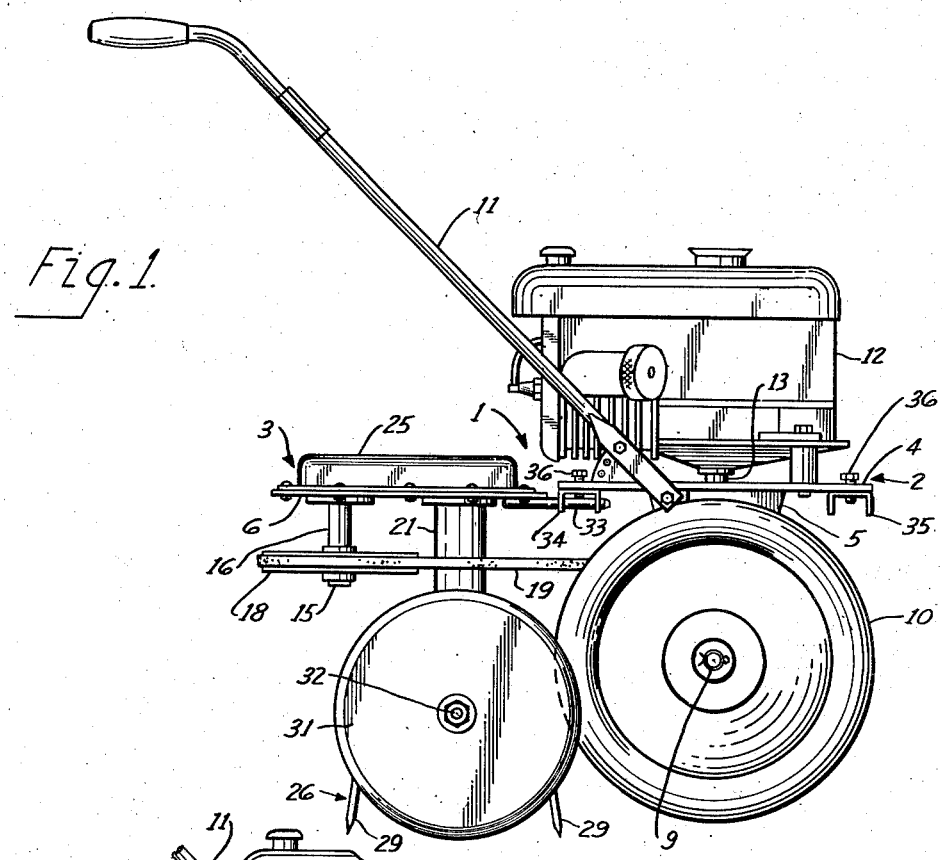
Figure 1 is a side elevation of a device embodying the principles of the present invention, showing the device in normal operating position.
Figure 2:
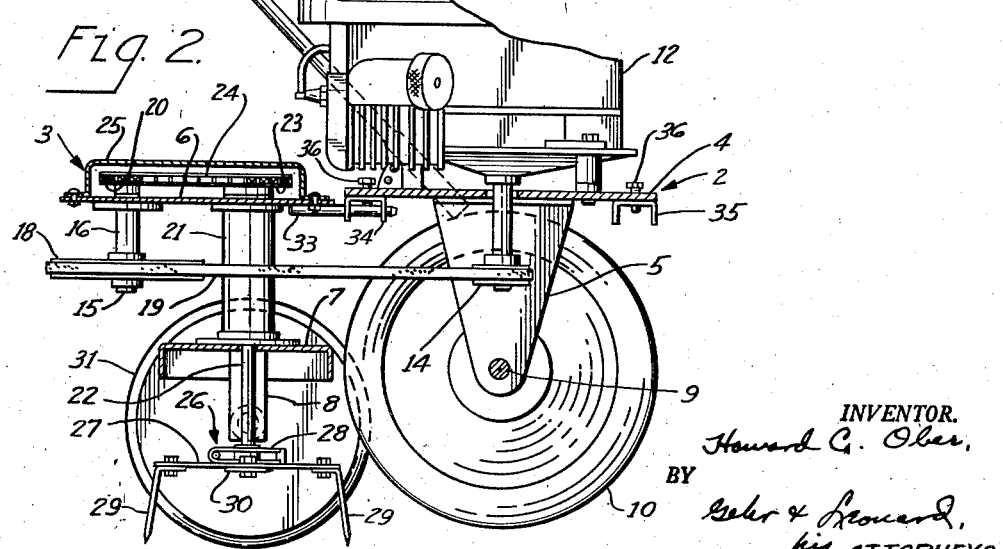
Figure 2 is a fragmentary side elevation similar to Figure 1, part thereof being shown in section for clearness in illustration.

Referring to the drawings, the device comprises a carriage, indicated generally at 1, having an engine carrying portion 2 and a rotary tool carrying portion 3. The engine carrying portion 2 comprises essentially a top wall or platform 4 with depending brackets 5, and is open at the bottom, front, and rear.

The tool carrying portion 3 comprises essentially a top wall or a platform 6, an intermediate wall 7 and brackets 8 depending from the wall 7 at its lateral margins. The tool carrying portion is open at the bottom, front and rear.

The engine carrying portion 2 is supported by a suitable axle 9 which is mounted in the brackets 5 and which, in turn, is supported by wheels 10.

Suitable manipulating handles 11 are detachably secured to the engine carrying portion 2 and extend rearwardly and upwardly therefrom to a convenient position for manipulation of the device by the operator. Thus either end of the engine carrying portion 2 can be raised and lowered by rocking the portion 2 about the axle 9.

Mounted on the engine carrying portion 2 is an engine 12 having an upright driving shaft 13 which extends below the platform 4 and, at its lower end, carries a pulley 14.

Referring next to the tool carrying portion 3, a power transmission mechanism is mounted on the platform 6. In the form illustrated, this mechanism comprises an upright shaft 15 rotatably mounted in suitable bearings in a reinforcing sleeve 16 which is supported in depending relation from the platform 6 of the tool carrying portion 3. Mounted on the lower end of the shaft 15 is a driven pulley 18 which is drivingly connected by a belt 19 to the engine pulley 14. At its opposite or upper end the shaft 15 extends to a level above the platform 6 and carries a sprocket 20.

A sleeve 21 is secured at its upper end to the platform 6 and extends in depending relation therefrom to the wall 7 to which the lower end of the sleeve is secured. An upright rotary tool shaft 22 is mounted in suitable bearings in the sleeve 21. A sprocket 23 is mounted on the upper end of the shaft 22 and is drivingly connected to the sprocket 20 by a suitable chain 24. A suitable detachable dust proof and grease retaining housing 25 encloses the sprockets and chain.

A tool 26, which preferably is a combined tilling and cutting or pulling tool is detachably secured to the lower end of the shaft 22 for rotation therewith. The tool 26 comprises a disc 27 coaxial with the shaft 22 and secured thereto for rotation therewith; for example, by means of a safety slip connection or clamping device 28 such as described in my copending application Serial No. 232,912, filed June 22, 1951.

Detachably mounted on the disc 27 in spaced relation to each other circumferentially of the disc are a plurality of depending sub-surface tilling tools or prongs 29 which slope downwardly and outwardly from the disc 27. The sub-surface prongs preferably are in the form of flat metal straps. Each is sharpened at its bottom edge and leading lateral edge.

In addition to the prongs 29 a plurality of supra-surface cutting or pulling prongs 30 are detachably mounted on the disc 27 and arranged in spaced relation to each other circumferentially of the disc and in alternate relation relative to the prongs 29. The prongs 30 are at a level such that they are normally spaced above the ground surface when the prongs 29 are penetrating the ground surface to the desired tilling depth. For example, the prongs 29 preferably extend a sufficient distance below the platform 6 so that, on level ground, they can enter the ground to a depth from ½" to 1½" while the wheels 10 are resting on the ground and the platform 6 and wheel 4 are horizontal.

Mounted on the carriage portion 3 are cutting and retaining discs 31. The discs 31 are rotatably mounted on coaxial transverse stub shafts 32 which in turn are mounted in the brackets 8 of the intermediate wall 7. The intermediate wall 7, in turn, is secured fixedly to the sleeve 21. The discs 31 are arranged to the opposite sides of the tool carrying portion 3 of the carriage and are disposed outwardly from, but very close to, the lateral limits of the path of rotation of the prongs 29. They are preferably located, forwardly and rearwardly of the carriage, so that their common axis intersects or is close to the axis of the shaft 22 if only one pair of discs are employed. Further, they are so disposed that their forward limits extend close to the rear limits of the wheels 10. The discs are of sufficient diameters so that they extend forwardly and rearwardly beyond the forward and rearward limits of the prongs 29. The axis of the discs and the axis of the wheels 9 are preferably so positioned relative to each other forwardly and rearwardly of the carriage that clods, chopped weeds and the like thrown laterally by the tool will strike the upright faces of the discs or wheels and be constrained thereby from passing beyond the lateral limits of the tilling path. The discs are preferably so arranged that their lower edges penetrate the soil to about the same depth as the lower ends of the tilling prongs 29.

It is desirable in some instances to arrange the tilling tool in trailing relation to the wheels 10 and in other instances in advance of the wheels 10. Accordingly, the tool carrying portion 3 is detachably connectable to either end of the engine carriage portion 2. For this purpose the platform 6 has secured thereto a pair of connecting rods 33 which extend forwardly and rearwardly of the platform 6 near the lateral limits thereof. At the forward and rear ends of the carriage portion 2 are connecting elements 34 and 35, respectively, each of which is cooperable with one of the rods 33 for detachably connecting the carriage portion 3 to the carriage portion 2.

In the form illustrated, the connectors 34 are channel shaped brackets, each having a pair of passages aligned forwardly and rearwardly of the engine carrying portion and positioned to receive one of the connecting rods 33 endwise. Set screws 36 are provided for engaging the rods 33, respectively, and binding them firmly to their associated connectors 34 when the rods are accommodated in the passages thereof. The connectors 35 are identical with the connectors 34. The connectors 34 and 35 and the rods 33 are so arranged that, when in connecting relation, the platforms 6 and 4 are secured in substantially end to end relation and at approximately the same level. The engine is so mounted on the platform 4 that the shaft 13 is midway between the connectors 34 and 35 in a direction forwardly and rearwardly of the carriage portion 2 so that the tool carrying portion can be mounted at either end of the carriage portion 2 and the belt brought to substantially the same tension.

In operation, with the tool rotatably driven, the carriage is manipulated by the handles 11 so as to cause the sub-surface tilling prongs 29 to penetrate the soil to the desired degree and till the soil. During the same operation, the prongs 30 either chop up weeds in the path of the tool 26 or pull the weeds. If chopping is desired, the leading edges of the prongs 30 are sharpened. If pulling only is desired, the leading edges of the prongs 30 may be relatively blunt.

During these operations, the loosened clods and chopped weeds are prevented from scattering laterally by the retaining discs 31 and partially by the wheels 10. Thus any plants alongside the path being tilled are protected from flying earth and debris.

Furthermore, the discs 31 loosen the soil alongside the path of the cutters and are sufficiently close to the path of the cutters that the soil cut by them can readily break loose. Further, any roots within the depth of penetration of the discs which extend laterally of the tilling path beyond the discs are severed so that the weeds or plants in the path can be more readily pulled loose and removed by the prongs 30.

In general the device can be moved at a fair pace unidirectionally along the path to be tilled but if extremely tenacious weeds and hard earth are encountered, the machine can readily be moved forwardly and rearwardly or be held in one spot until the particular hard packed earth or weeds are loosened or chopped up as the case may be.

If more confining action is desired, another set of discs similar to the discs 31 and correspondingly mounted can be arranged farther to the rear of the discs 31 and substantially in alignment therewith, respectively, forwardly and rearwardly of the carriage. For example, they may be set with their axis almost as far to the rear of the axis of the discs 31 as the axle of the wheels 10 is forwardly of the axis of the discs 31 so that their forward limits overlap the rear limits of the discs 31.

Having thus described my invention, I claim:

1. A tilling device comprising a carriage, a power driven rotatable tool mounted on the carriage for rotation about a generally upright axis, ground engaging cutting discs, each disc being rotatably mounted on the device for rotation about a generally horizontal axis extending generally transversely of the carriage, said discs being disposed at opposite sides of the carriage and aligned transversely of the carriage with the tool, said tool comprising a plurality of subsurface tillers spaced apart from each other about the rotatable axis of the tool and extending from a level above the surface of the ground to a level below the surface of the ground in the normal operating position of the tool, each of said discs extending from the foremost to the rearmost limits of the path of rotation of the tillers and being closely adjacent the lateral limits, respectively, of the path of rotation of the tillers, and solid disc supporting wheels on the carriage at opposite sides thereof and closely adjacent the planes of the discs, respectively, the axis of the wheels extending generally parallel to the axis of the discs and being spaced longitudinally of the carriage from the axis of the discs a distance less than the sum of the radius of a disc and the radius of a wheel.

2. A tilling device comprising a carriage, a power driven rotatable tool mounted on the carriage for rotation about a generally upright axis, ground engaging cutting discs, each rotatably mounted on the device for rotation about a generally horizontal axis extending generally transversely of the carriage, said discs being disposed at opposite sides of the carriage and aligned transversely of the carriage with the tool, said tool comprising a plurality of subsurface tillers spaced apart from each other about the rotatable axis of the tool and extending from a level above the surface of the ground to a level below the surface of the ground in the normal operating position of the tool, each of said discs extending from the foremost to the rearmost limits of the path of rotation of the tillers and to a subsurface level when the tillers are in tilling position, said discs being so close to the lateral limits, respectively, of the path of rotation of the tillers that soil between the kerf cut by each disc and the adjacent lateral limit of the path of the tillers is broken loose along the kerf by the force of the tillers applied against the soil at said adjacent lateral limit of the path of the tillers, and solid disc supporting wheels on the carriage at opposite sides of the carriage, respectively, and closely adjacent the planes of the discs, respectively.

References Cited in the file of this patent

UNITED STATES PATENTS

| | | |
|---|---|---|
| 148,226 | Marsh | Mar. 3, 1874 |
| 1,526,586 | Becker | Feb. 17, 1925 |
| 2,539,934 | Smith et al. | Jan. 30, 1951 |
| 2,614,473 | Yacoby | Oct. 21, 1952 |
| 2,619,891 | Sloper | Dec. 2, 1952 |
| 2,684,495 | Litkenhous | July 27, 1954 |
| 2,706,441 | Caldwell et al. | Apr. 19, 1955 |

FOREIGN PATENTS

| | | |
|---|---|---|
| 596,593 | Great Britain | Jan. 7, 1948 |